March 17, 1942.　　　S. CLAUSEN　　　2,276,289
CIGAR MACHINE FILLER FEED
Filed April 29, 1936　　13 Sheets-Sheet 1
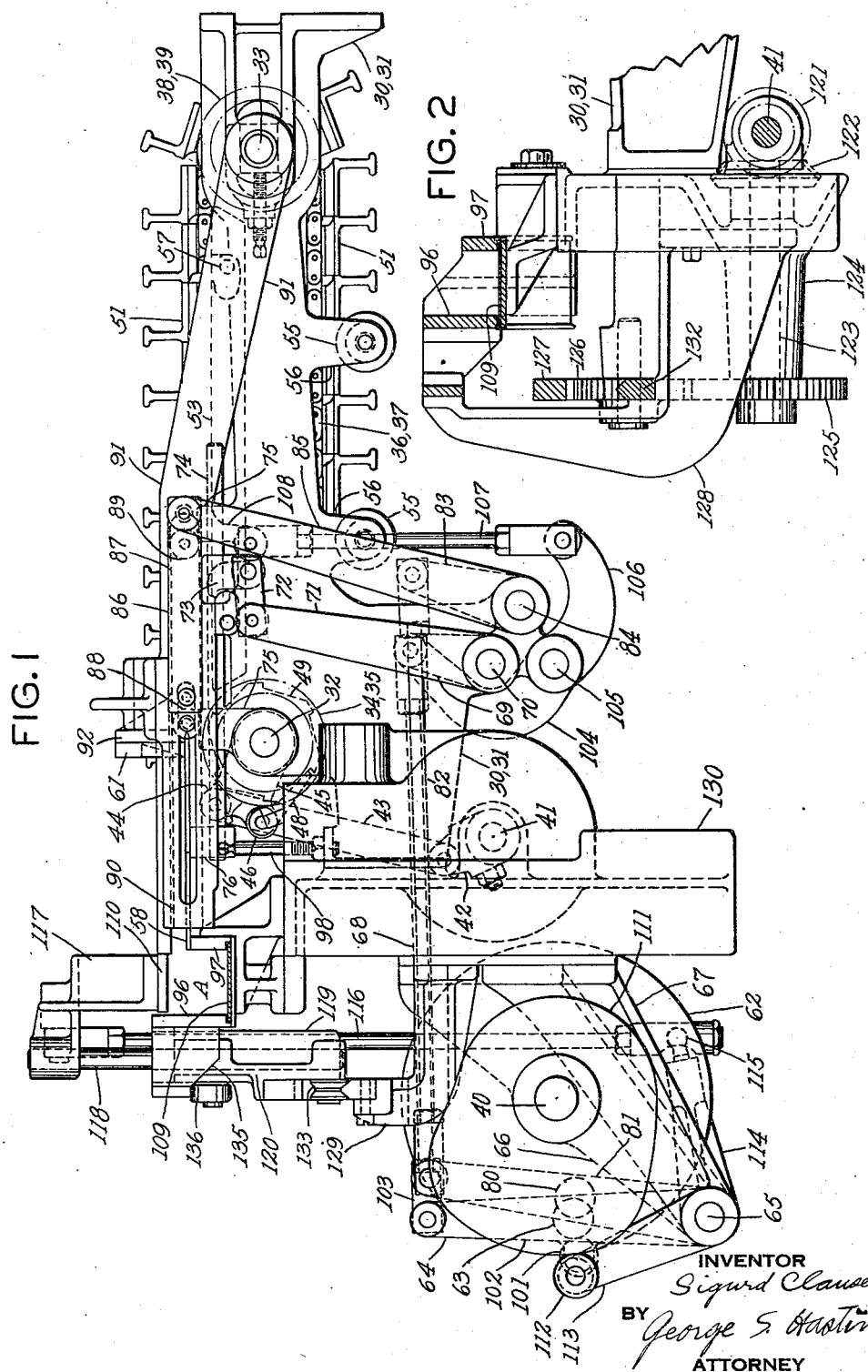
INVENTOR
Sigurd Clausen
BY George S. Hastings
ATTORNEY

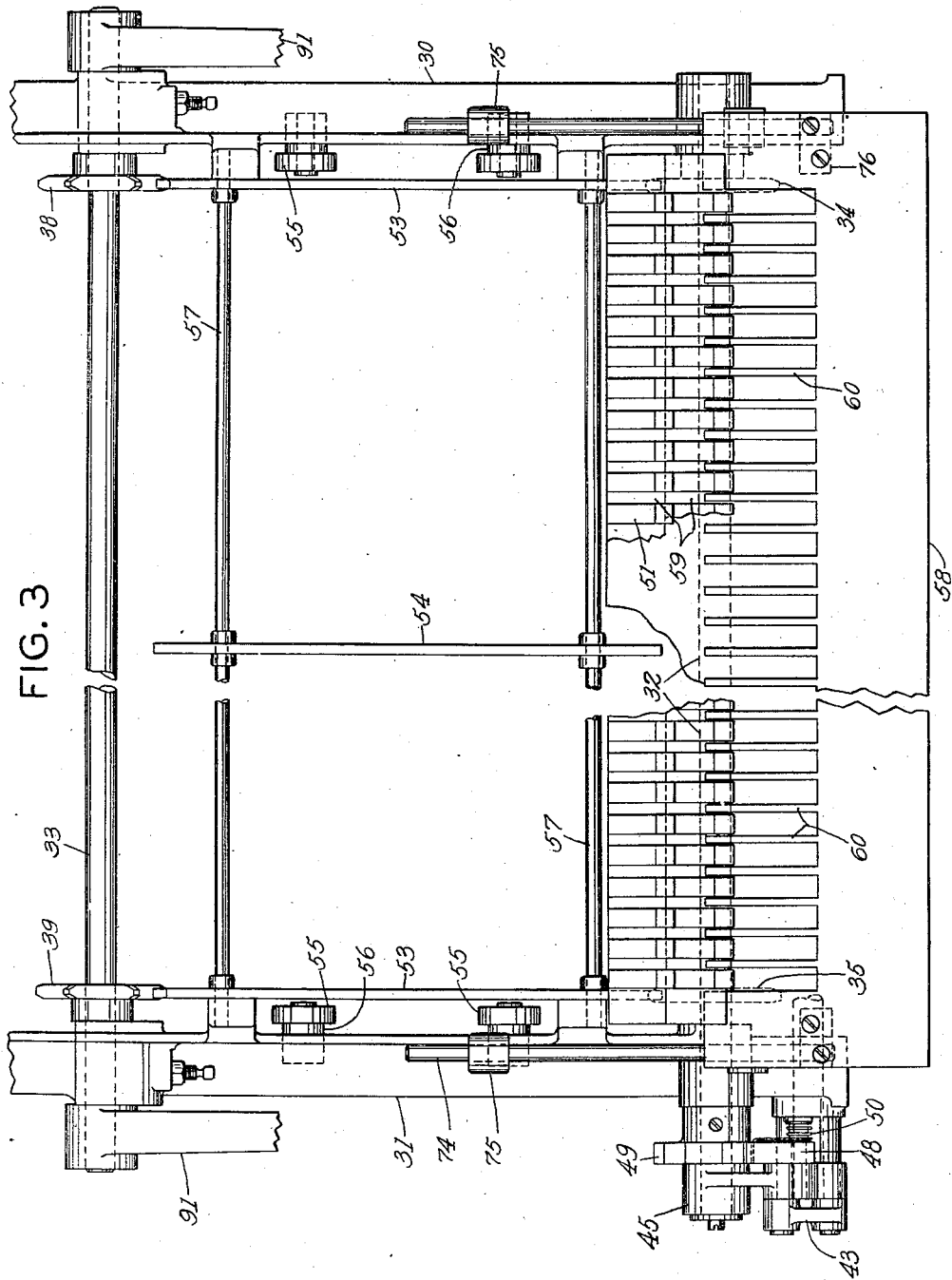

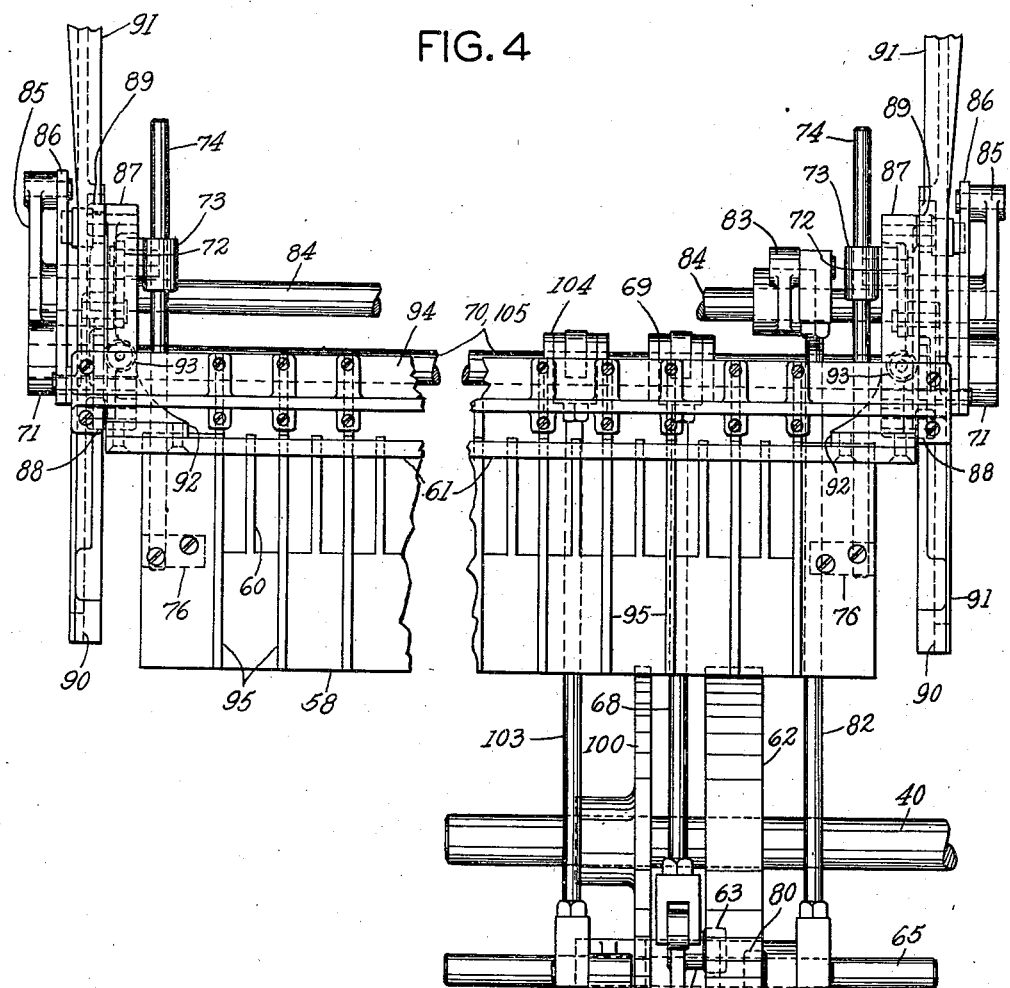

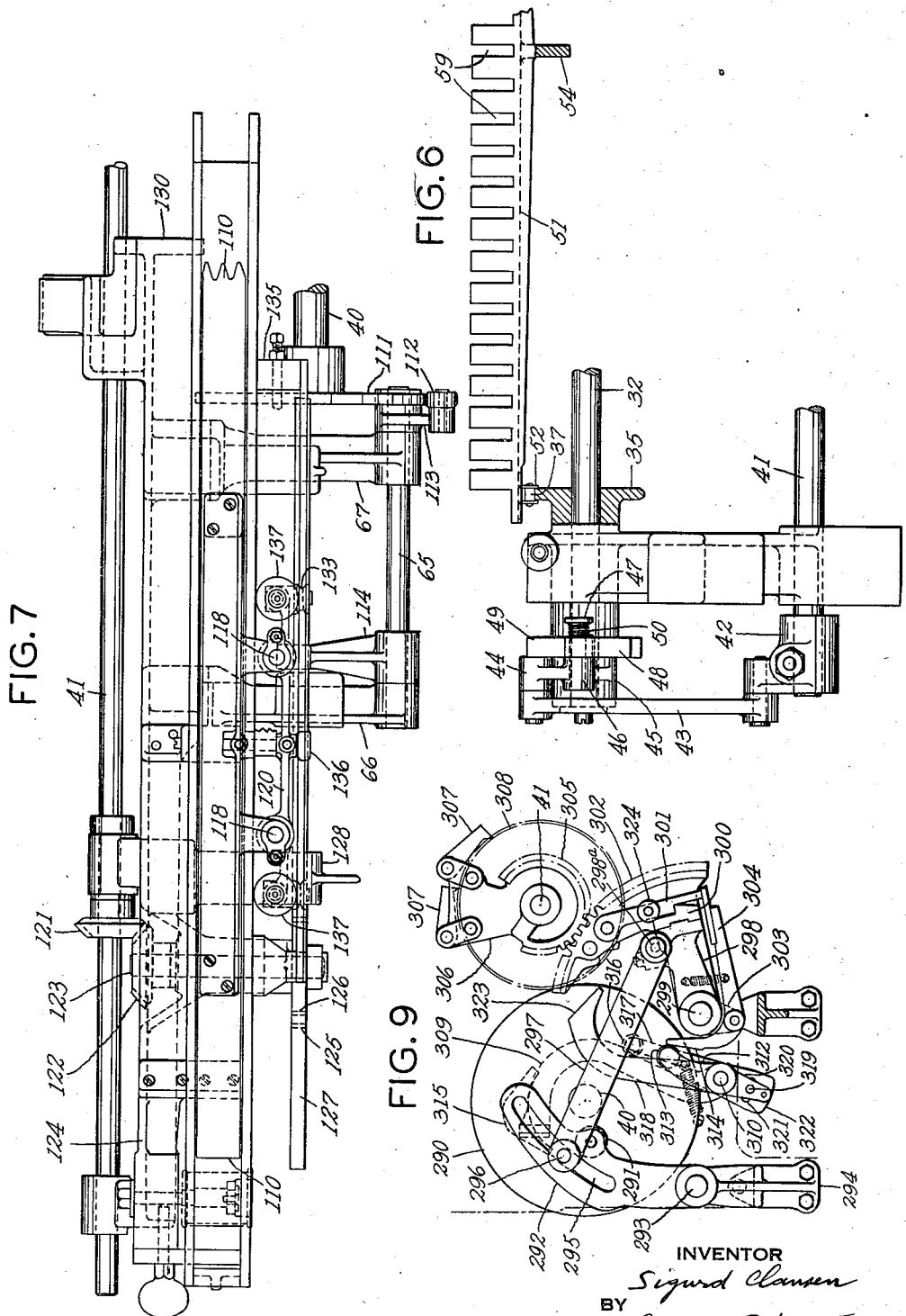

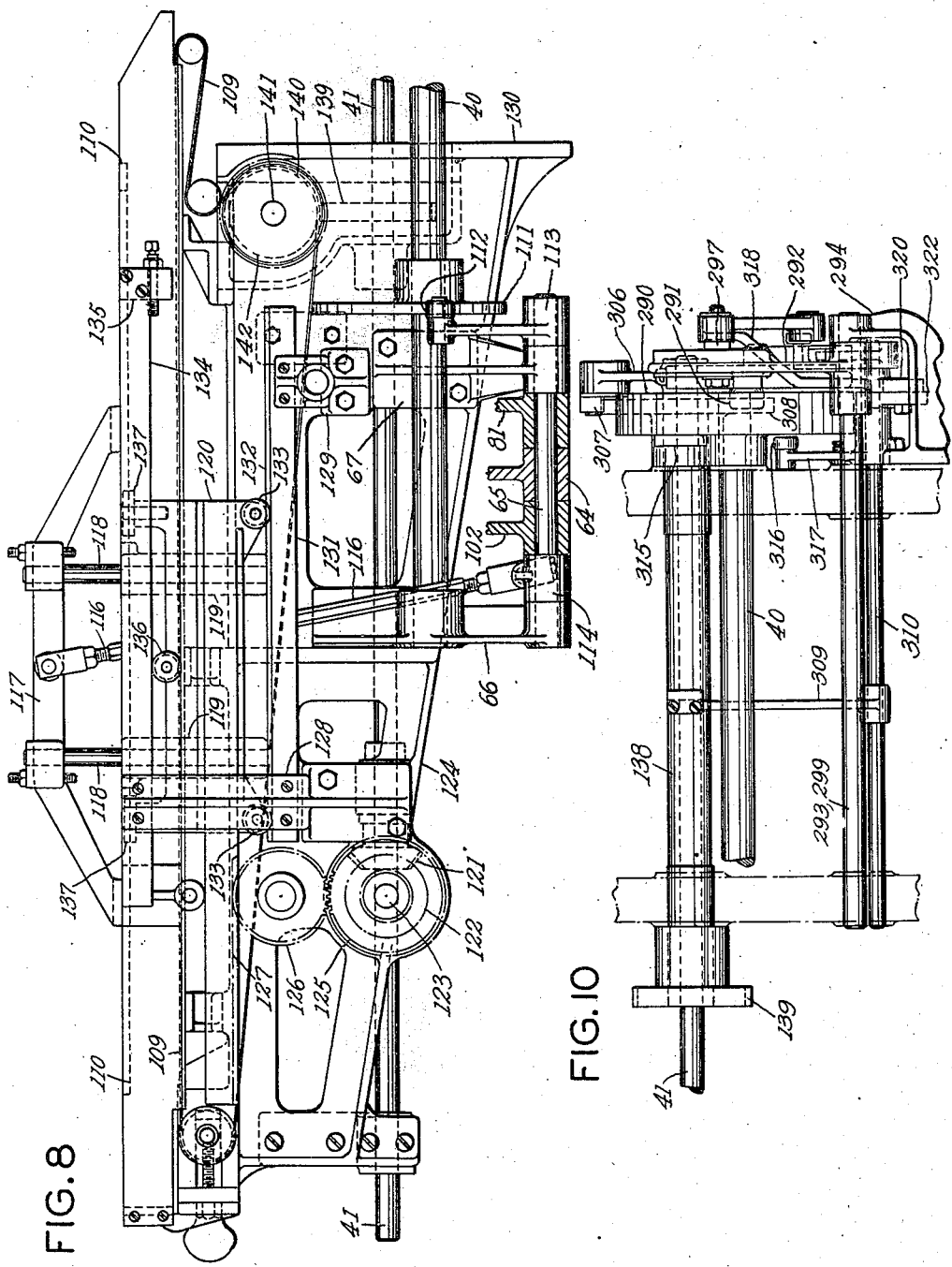

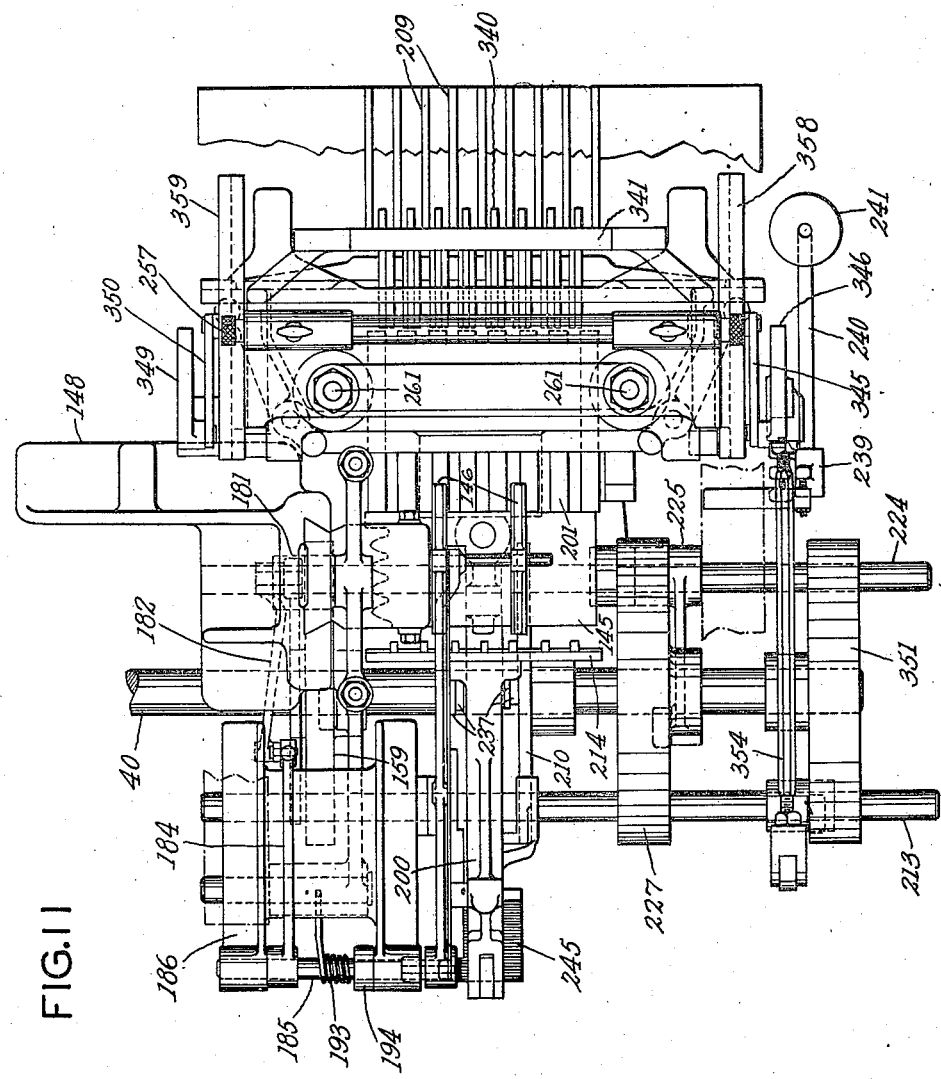

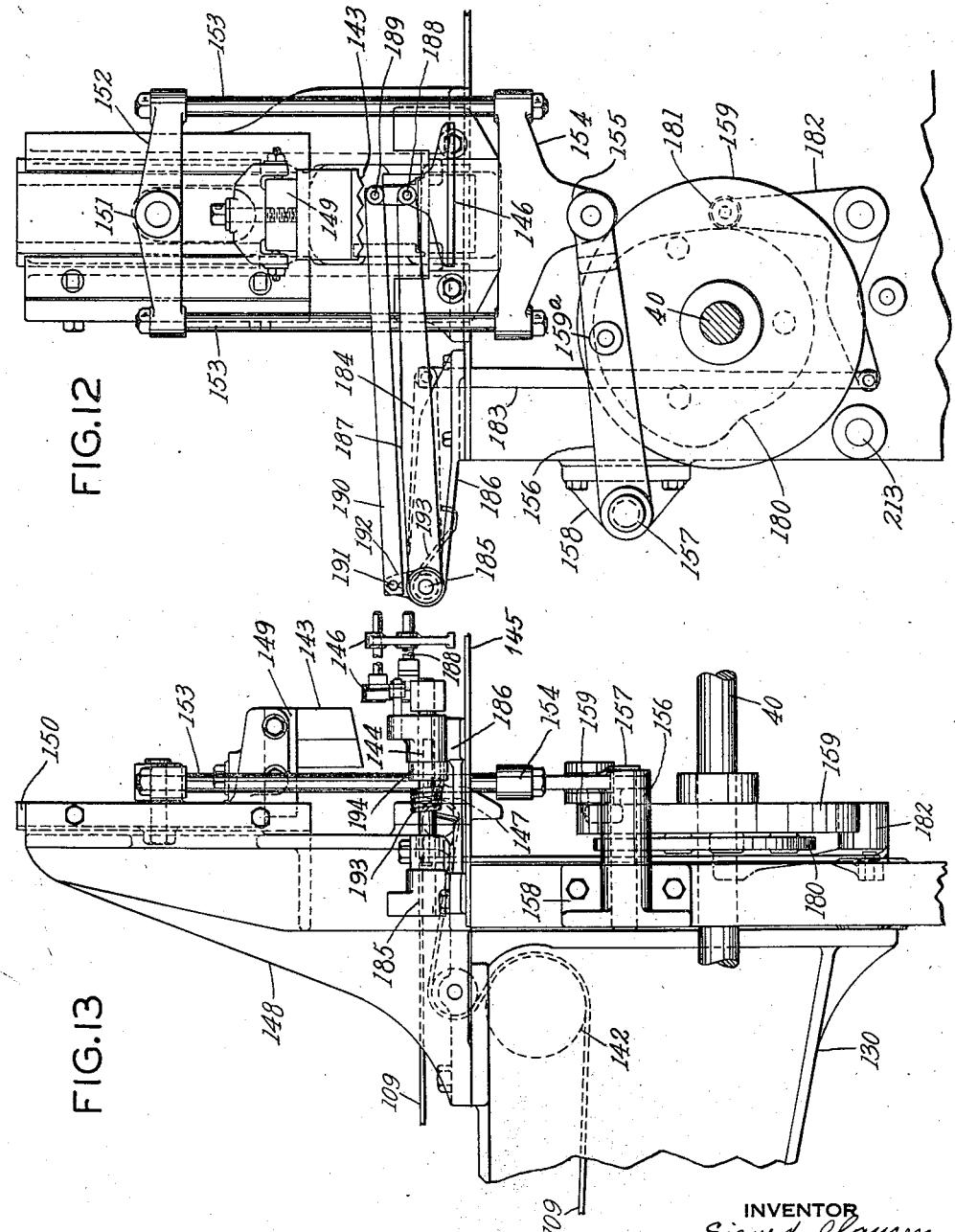

March 17, 1942. S. CLAUSEN 2,276,289
CIGAR MACHINE FILLER FEED
Filed April 29, 1936 13 Sheets-Sheet 8
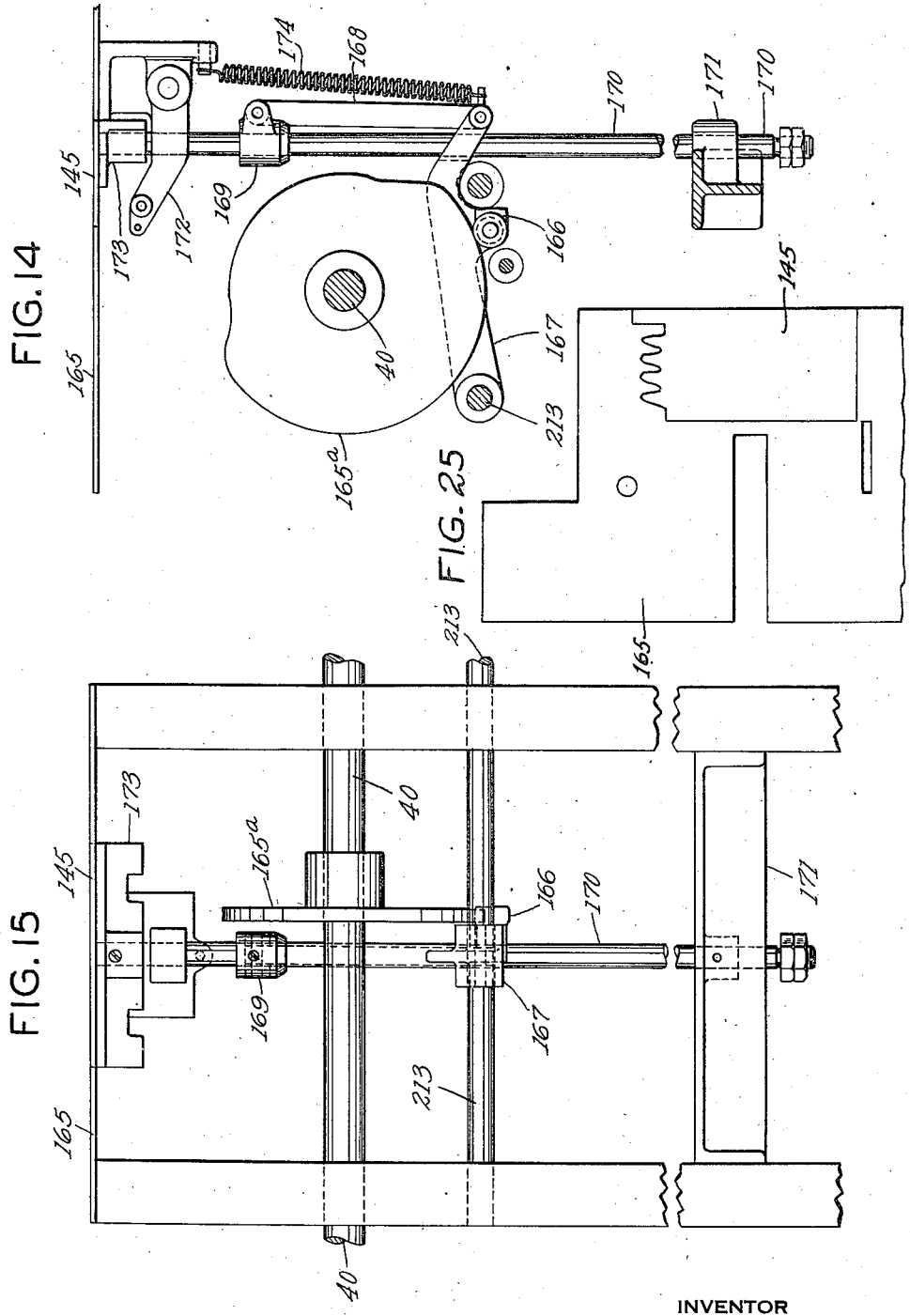
INVENTOR
Sigurd Clausen
BY George S. Hastings
ATTORNEY March 17, 1942.  S. CLAUSEN  2,276,289
CIGAR MACHINE FILLER FEED
Filed April 29, 1936   13 Sheets-Sheet 9
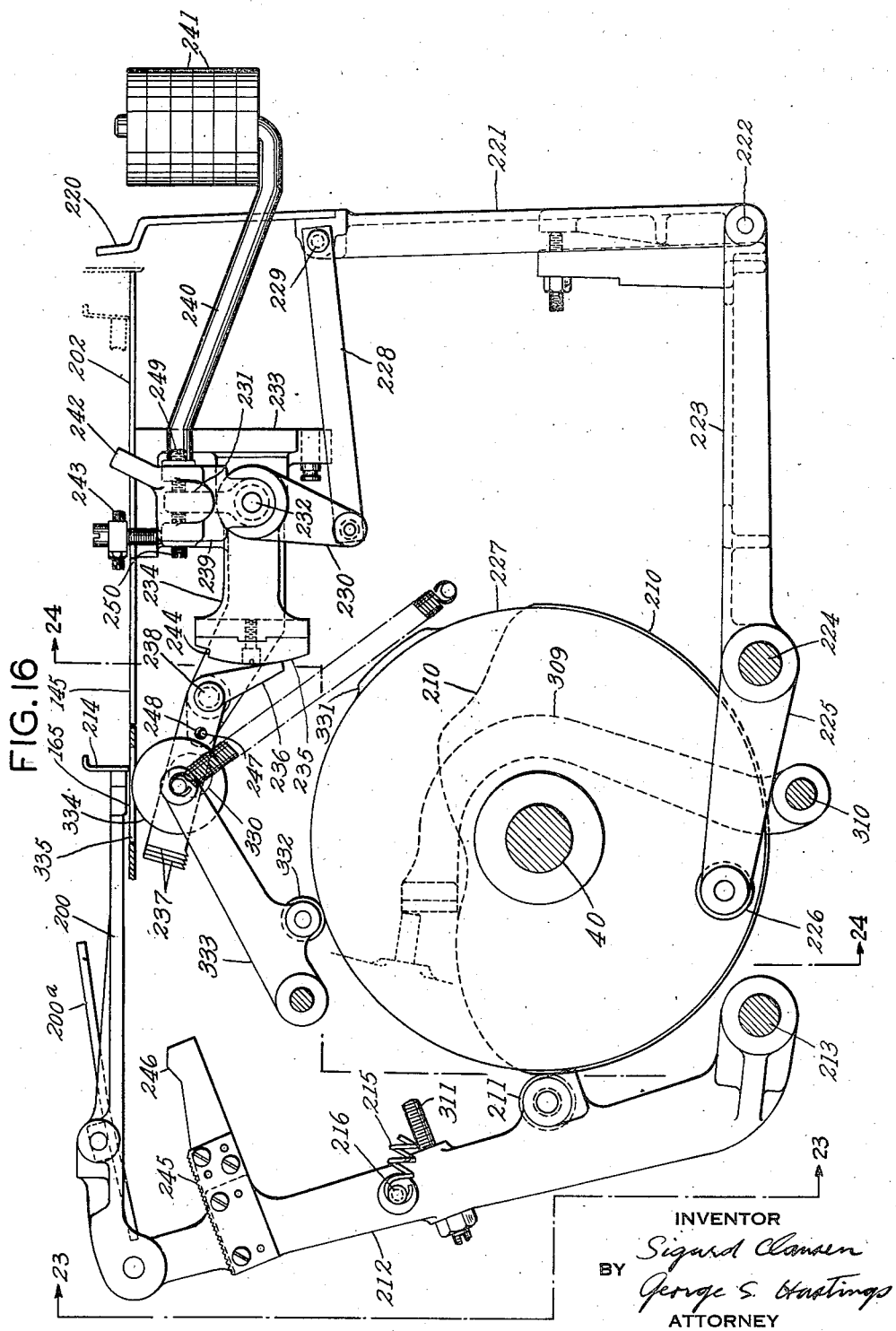
INVENTOR
Sigurd Clausen
BY George S. Hastings
ATTORNEY March 17, 1942. S. CLAUSEN 2,276,289
CIGAR MACHINE FILLER FEED
Filed April 29, 1936 13 Sheets-Sheet 10
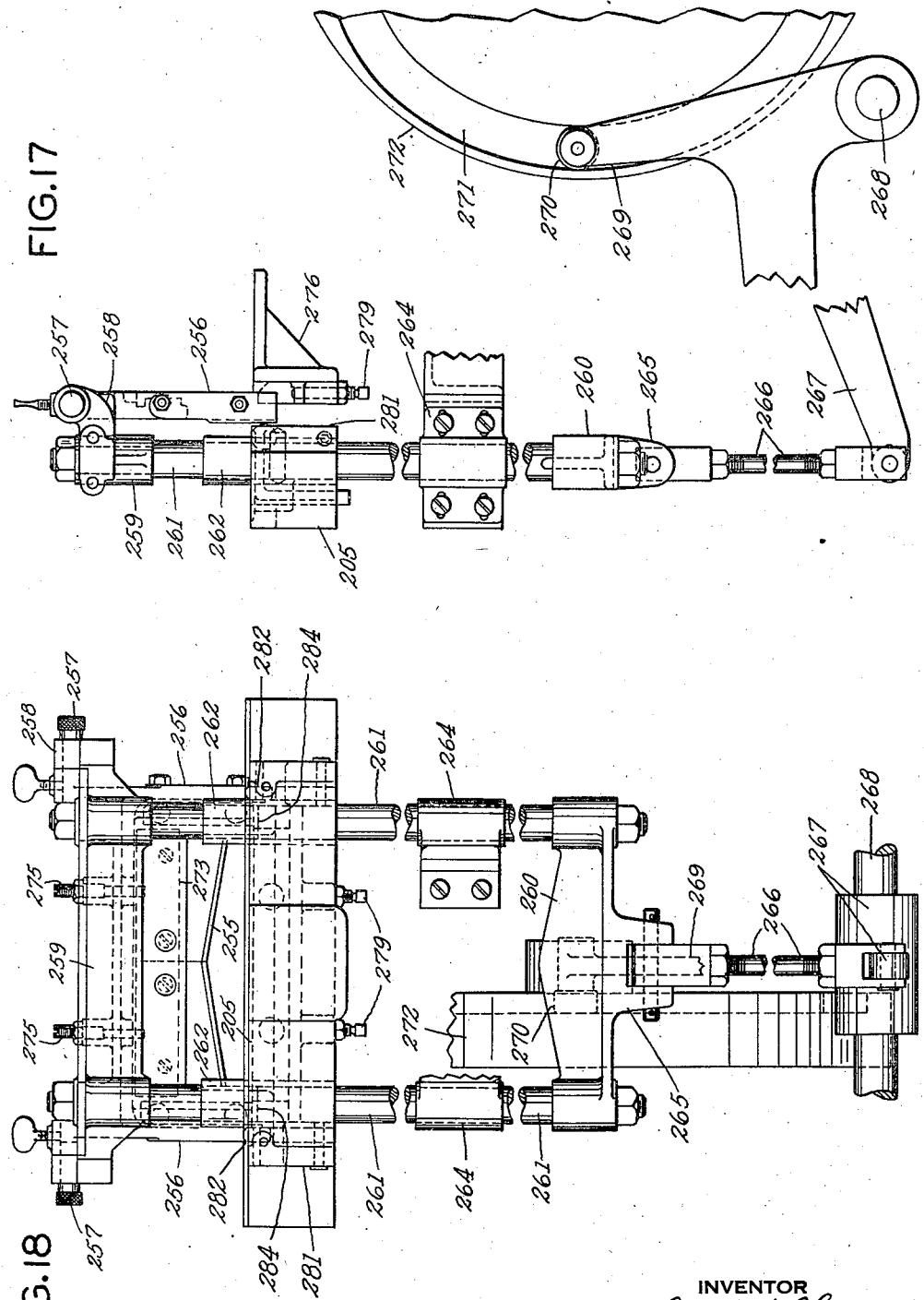
INVENTOR
Sigurd Clausen
BY George S. Hastings
ATTORNEY March 17, 1942.  S. CLAUSEN  2,276,289
CIGAR MACHINE FILLER FEED
Filed April 29, 1936  13 Sheets-Sheet 11
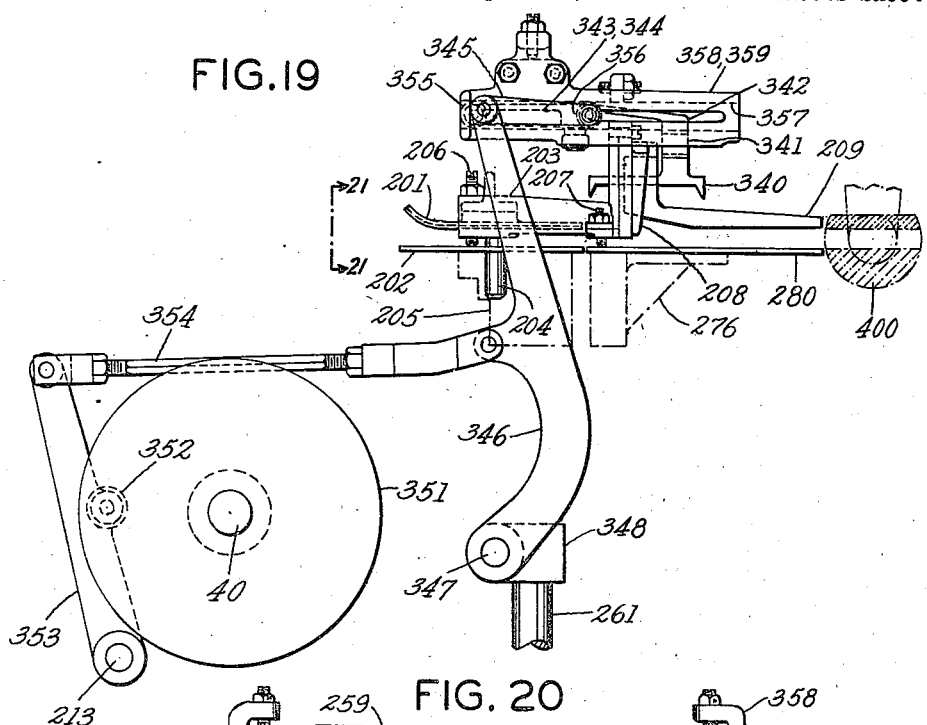
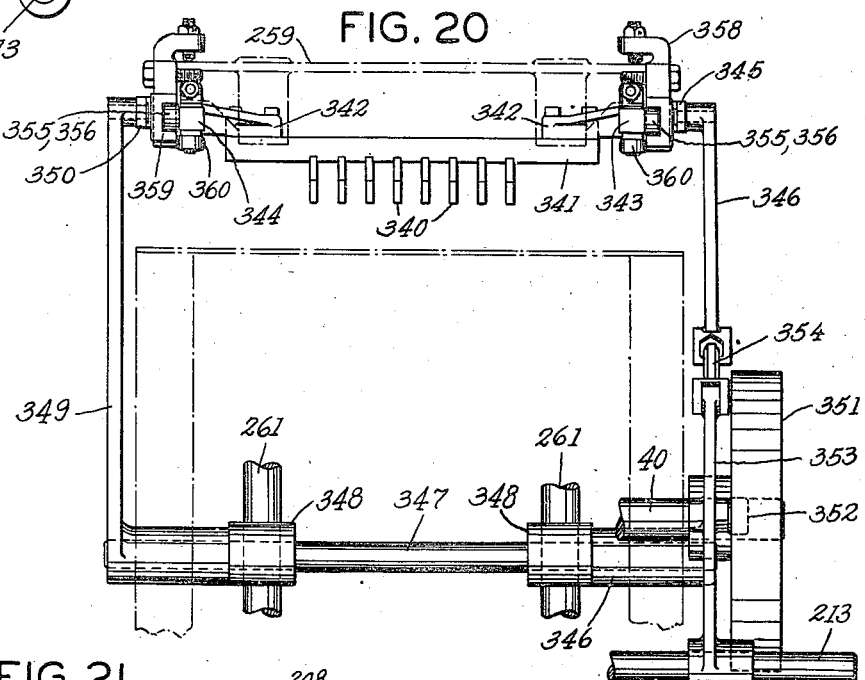
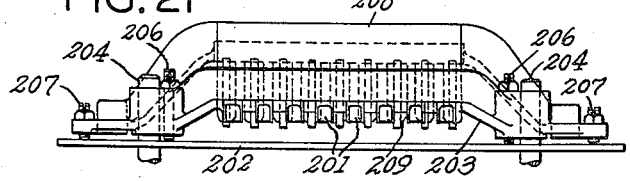
INVENTOR
Sigurd Clausen
BY George S. Hastings
ATTORNEY March 17, 1942.                S. CLAUSEN                2,276,289
                         CIGAR MACHINE FILLER FEED
                         Filed April 29, 1936        13 Sheets-Sheet 12

INVENTOR
SIGURD CLAUSEN
BY
ATTORNEY

March 17, 1942. S. CLAUSEN 2,276,289
CIGAR MACHINE FILLER FEED
Filed April 29, 1936 13 Sheets-Sheet 13
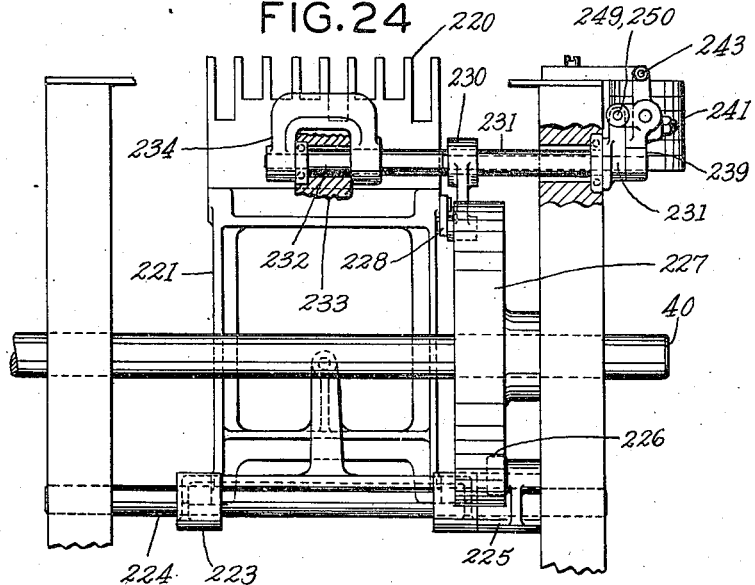
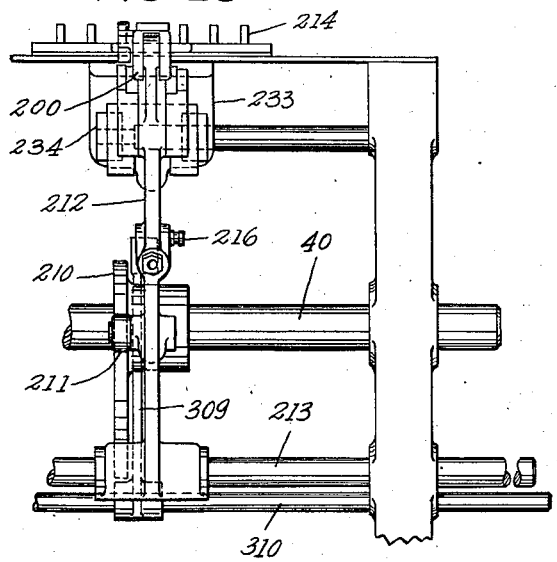
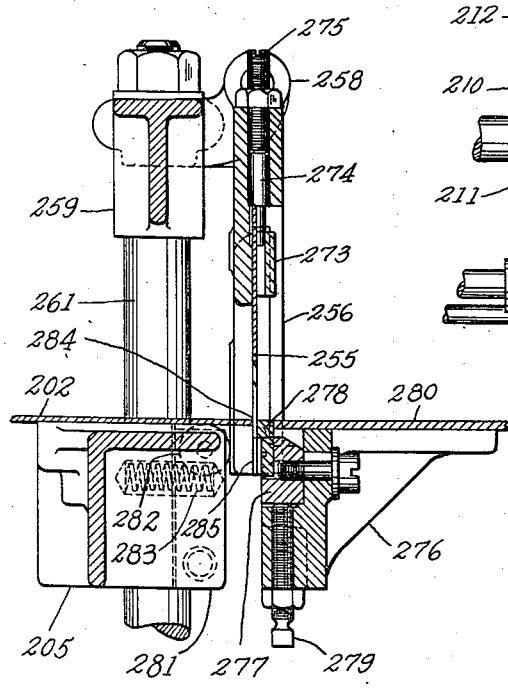
INVENTOR
Sigurd Clausen
BY George S. Hastings
ATTORNEY Patented Mar. 17, 1942

2,276,289

UNITED STATES PATENT OFFICE 2,276,289

CIGAR MACHINE FILLER FEED

Sigurd Clausen, Brooklyn, N. Y., assignor to International Cigar Machinery Company, a corporation of New Jersey Application April 29, 1936, Serial No. 76,932

30 Claims. (Cl. 131—21)

This invention relates to cigar machines of the long filler or "fresh work" type, more particularly to a filler feed for cigar bunch rolling machines. Certain of the filler feeds now in use include a cross-feed channel, wherein the filler tobacco is laid lengthwise to form a layer approximating in depth, the desired thickness of bunch charge; and bunch lengths are severed from this layer and transferred sidewise to the main feed belt whereon they are thus assembled side by side to form a column which is advanced under a knife which severs bunch charges therefrom, the severed bunch charges being successively inserted in a charge transfer which delivers them to a bunch rolling mechanism.

The main object of the invention is to dispense with the necessity of first building up a layer or filler tobacco having the desired thickness of bunch charge. To this end there is provided an endless series of traveling troughs in which a single layer of tobacco leaves may be laid lengthwise therealong and the troughs deliver their contents to a cross-feed belt which extends transversely of the direction of movement of the troughs. The cross-feed belt is intermittently driven so that a stream of lengthwise moving cigar filler will be formed thereon composed of a plurality of layers disposed in endwise overlapping or shingled relation. In this manner a stream of filler tobacco having a thickness approximating that of the bunch charge will be formed. Moreover, a uniform stream of tobacco substantially devoid of high places and holes will be formed.

A further object of the invention is to avoid the disadvantages inherent in the tilting platform commonly used in filler feeds of the cross-feed type. In the form of cross-feed illustrated in Patent #1,740,571, granted December 24, 1929, on the application of W. B. Bronander, the stream of filler tobacco is advanced across a tilting platform whereon bunch lengths are severed from the stream, the platform then tilting downwardly to permit the severed bunch lengths to be transferred sidewise to the main feed belt for assembly with the previously transferred bunch lengths in the form of a column. A portion of the inner side edge of this tilting platform is cut away to correspond to and fit the corrugated cutter which severs the bunch length after the stream of filler tobacco has been advanced on to the platform. Accordingly, when the severed bunch length is pushed sidewise down the tilted platform, portions of the severed bunch length may drop down through the cut away portion of the inner edge of the platform. In the present invention by using a vertically movable platform or one that descends to a horizontal position at a lower level wherein the corrugated edge of the platform interfits a cut away or corrugated portion of the edge of a table across which the bunch length is to be transferred sidewise, the stated disadvantage may be overcome.

A further object of the invention is to avoid the necessity of providing a cross-feed channel composed of a series of endless feed belts and to use a single cross-feed belt instead. To this end the single cross-feed belt is provided with a compactor plate which moves with the belt and assists in feeding the stream of filler tobacco on to the platform.

Still another object of the invention is to assure the formation of bunch charges of uniform density by compacting the severed bunch lengths to a uniform density. It is my belief that it is difficult to obtain a uniform density in a long column of tobacco during the compacting thereof, especially when star wheels are employed to feed the severed bunch lengths against a density measuring finger. For this reason I prefer to compact the severed bunch lengths individually and thus avoid the accumulation of a column of tobacco of excessive length, although in practice there is a slight excess in each bunch length which remains after the severance of the bunch charge and augments the next bunch charge, and replace the star wheels used heretofore by a pusher which advances the severed bunch length sidewise against the density measuring finger, the latter controlling mechanism for interrupting the advance of the pusher when the desired density has been attained. Thereupon the bunch charge is severed from the bunch length. Of course the remainder of the bunch length will be compacted together with the next bunch length into a column from which the next bunch charge will be severed; and in the continued operation of the machine sufficient tobacco would accumulate to form a column of excessive length, unless the severing and delivery of the following bunch lengths were temporarily interrupted. A further object of the invention therefore, is to interrupt the advance of the cross-feed belt and troughs whenever sufficient tobacco for slightly more than two bunch charges accumulates in the column.

Still another object of the invention is the provision of a more accurate controlling mechanism for interrupting the advance of the cross-feed belt. In prior controlling mechanisms a pawl mounted on a vibrating arm was tripped during the forward stroke of the arm, into engagement with a ratchet which drives the cross-feed belt, wherefore the pawl sometimes engaged the wrong ratchet tooth and inaccuracies in the advance of the cross-feed belt resulted. In the present invention the controlling mechanism includes gearing connected to an arm carrying a pawl in constant contact with a ratchet driving the cross-feed belt, a vibratory member, and means for connecting the gearing to the vibratory member to drive the cross-feed belt and thereafter disconnecting the gearing from the vibratory member during the forward stroke of the latter to interrupt the advance of the cross-feed belt, so that the inaccuracy just mentioned will be avoided.

Other objects are the provision of adjusting means for the bunch length transfer platform and the ledger plate of the charge cutting knife and a reaper of novel construction operating on a new principle whereby a charge cut in the previous cycle of the machine will be inserted into the charge transfer while the following charge will be advanced sidewise into position for delivery to the charge transfer during the next cycle.

With these and other objects not specifically mentioned in view, the invention consists in certain constructions and combinations hereinafter fully described and then specifically set forth in the claims hereunto appended.

In the accompanying drawings which form a part of this specification and in which like characters of reference indicate the same or like parts:

Fig. 1 is a side elevation of the improved filler feed;

Fig. 2 is a detail sectional view of a portion of the same;

Fig. 3 is a detail plan view of another portion of the filler feed;

Fig. 4 is a detail plan view of the reaper;

Fig. 5 is an end elevation of the same;

Fig. 6 is a detail end view of certain parts of the portion of the filler feed shown in Fig. 3;

Fig. 7 is a plan view of the cross-feed unit;

Fig. 8 is a side view of the same;

Fig. 9 is a detail end view of the cross-feed driving mechanism;

Fig. 10 is a side view of the same, and also a continued side view of Fig. 8;

Fig. 11 is a plan view showing the corrugated cutter, measuring fingers, knife and reapers of the filler feed unit;

Fig. 12 is a side view of the corrugated cutter and clamp finger units;

Fig. 13 is an end view of the same;

Fig. 14 is a side view of the filler elevator;

Fig. 15 is an end view of the same;

Fig. 16 is a side view of the measuring finger unit;

Fig. 17 is a side view of the knife unit;

Fig. 18 is an end view of the same;

Fig. 19 is a side view of the filler guide and reaper units;

Fig. 20 is an end view of the same;

Fig. 21 is an end view taken on line 21—21 of Fig. 19;

Fig. 22 is an enlarged sectional detail view of a portion of Fig. 17;

Fig. 23 is an end view taken on line 23—23 of Fig. 16;

Fig. 24 is an end view taken on line 24—24 of Fig. 16; and Fig. 25 is a detail plan view of the platform for transferring the severed bunch length to the lower level at which it is compacted.

Figure 19A:
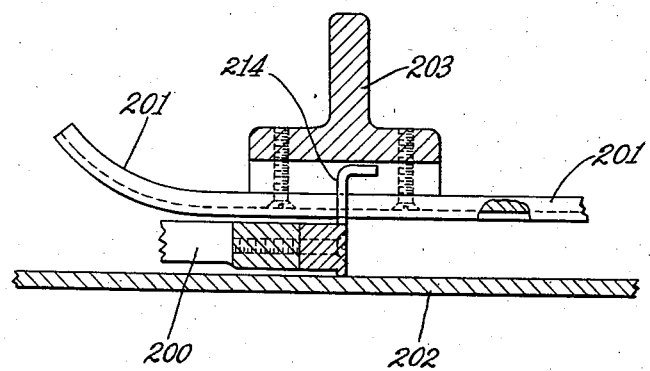
Fig. 19a is a fragmentary sectional view on an enlarged scale showing how the prongs on the pusher 214 enter into the spaces between the lateral edges of the upper guides shown in Fig. 19.

Referring to the drawings, the side frames 30 and 31 (Figs. 1, 2 and 3) support sprocket shafts 32 and 33. Shaft 32 is intermittently driven as hereinafter described and carries drive sprockets 34 and 35 which drive endless conveyor chains 36 and 37 running over sprockets 38 and 39, respectively, mounted on shaft 33.

The main cam shaft (not shown), of the cigar bunch rolling machine may be connected to the cam shaft 40 (Fig. 1) of the present filler feed to continuously drive the same. Suitable control mechanism (Fig. 9), which will be described later, is actuated from the cam shaft 40 and connected to a shaft 41 (Fig. 1) to intermittently turn the same. One end of the shaft 41 (Fig. 6), is equipped with a crank 42 which is connected by a wrist-pin to a link 43 pivotally connected to one lug 44 of a rocker-arm 45 having its hub loosely mounted on the end of shaft 32. In the other lug 46 of the arm 45 is fastened a stud 47 on which is pivotally mounted a pawl 48 which is held in engagement with a ratchet wheel 49 fixed on shaft 32 by spring 50, (Figs. 3 and 6) coiled around the stud 47 and having one of its ends anchored in the head of stud 47, its other end being anchored in the pawl 48. Thus, the spring 50 tends to hold the pawl in contact with the ratchet at all times.

Referring to Figs. 1 and 6, it will be seen that the conveyer chains 36 and 37 support an endless series of spaced troughs or pockets 51 of L-shaped cross-section and having their ends attached to flanges provided on regularly spaced links 52 of the conveyor chains. The upper runs of the conveyor chains ride on the outer rails 53, and therealong a central rail 54 engages the bottom of the pockets 51 whereby the pockets are kept in alignment. The bottom loops of the conveyor chains are guided by rollers 55 which serve to prevent sagging thereof, said rollers 55 being mounted on studs carried by the lugs 56 of the frames 30 and 31. The rails 53 and rail 54 are supported on cross-bars 57 carried by the side frames 30 and 31.

The stemmed tobacco leaves which constitute the filler for the cigar bunches are placed lengthwise by an operator along the successive troughs 51 of the conveyor chains. Ordinarily, it will be necessary to place only a single layer of leaves in the troughs, but in the case of very thick bunches, two layers may be required. The filled pockets are advanced intermittently, due to the action of the pawl and ratchet mechanism driving the shaft 32, towards a platform 58. The upright webs of the pockets 51 are provided with a plurality of spaced notches 59 which coincide with a series of spaced fingers 60 projecting from the platform 58; wherefore, when the pockets successively pass over the sprockets 34 and 35 (Figs. 1 and 3) the slots 59 pass by the slotted fingers 60 which enter their notches 59, thus removing the filler tobacco therefrom and depositing it on the platform 58. The platform 58 and a stripper 61 are then moved, as will be presently described, towards the cross-feed channel A into which the leaves are to be delivered.

The platform 58 is actuated in the following manner from the cam 62 (Fig. 4) mounted on shaft 40. A cam track provided in one face of the cam 62 engages a roller 63 which is carried by a cam lever 64 fulcrumed on a shaft 65 supported in the brackets 66 and 67 (Fig. 8). The cam lever 64 is connected by a rod 68 to an arm 69 which is fixed on a shaft 70 journaled in the side frames 30 and 31. Arms 71 fixed on the ends of shaft 70 are linked by bars 72 to collars 73 which are fixed on rods 74. These rods 74 are slidably mounted in bearings 75 of the side frames 30 and 31 and are fastened in blocks 76 suspended from the platform 58, and in this manner a back and forth motion is imparted to the platform 58.

The stripper 61 is also actuated from the cam 62 which is provided in its other face with a cam track engaging a cam roller 80 carried by a cam lever 81. The lever 81 is fulcrumed on shaft 65 and is linked by a rod 82 to an arm 83 fixedly mounted on a cross-shaft 84 journaled in the side frames 30 and 31. On the ends of the shaft 84 are fastened the arms 85 which are connected by links 86 to slide-brackets 87. Brackets 87 are equipped with rollers 88 and 89 which run in tracks 90 provided in the free ends of the arms 91 pivotally mounted on either end of shaft 33. To the upright faces 92 of the brackets 87 are fastened the ends of the transversely extending stripper bar 61. To assure free and smooth operation of the stripper, the bracket 87 is also equipped with a roller 93 which engages the lower rim of the track in each of the arms 91. A tie bracket 94 (Figs. 4 and 5) connecting the arms 91 carries a series of spaced guide bars 95 which rest upon the filler tobacco on the platform 58, thus preventing the same from curling or becoming otherwise disarranged while being transported towards the cross-feed channel A.

As each pocket 51 of the conveyor chains discharges the filler tobacco upon the platform 58, said platform and stripper 61 by means of the connections to their respective cams, previously described, are moved towards the cross-feed channel A. The advance of the platform 58 is stopped shortly before it reaches the outer wall 96 (Fig. 1) of the cross-feed channel; and the stripper bar 61, which has advanced therewith, stops above the inner wall 97 of the cross-feed channel. When the filler tobacco has thus been advanced and positioned over the cross-feed channel, the platform then retreats but the stripper remains stationary whereby the tobacco is kept from being drawn back with the platform; and the continued retreat of the platform eventually permits the leaves and a pressure plate 110 to descend into the channel between the walls 96 and 97. The stripper then retreats; and, in retreating, the arms 91, which swing about their pivot 33, are lifted by mechanism to be presently described, thus removing the stripper 61 from the path of the oncoming tobacco leaves delivered from the next trough. After the arms have retreated sufficiently, they descend, following the delivery of the tobacco from the next trough to the platform, into position against adjustable stop screws 98 (Fig. 1) which are threaded into the frames 30 and 31.

The up and down motion of the arms 91 is imparted thereto from a cam (not shown) fixed on shaft 40. A cam roller 101, which is carried by a cam lever 102 fulcrumed on shaft 65, engages a cam groove in one face of cam 101. The lever 102 is connected by a rod 103 to an arm 104 fastened on a cross-shaft 105 supported by frames 30 and 31. On the ends of the shaft 105 are fastened the arms 106 which are linked by rods 107 to lugs 108 provided on the arms 91.

The tobacco leaves delivered to the cross-feed channel are thus deposited in shingled relation, each layer of the stream so formed overlapping the preceding layer, on an intermittently driven belt 109 which moves the same away at right angles to its previous direction of travel. In the embodiment of the invention shown herein, the belt 109 is periodically advanced a suitable fraction of the length of a trough, such as a fifth, so that the contents of the troughs are deposited in the desired shingled relation. This tends to eliminate holes or high places in the layer of filler tobacco thus assembled. In order to prevent any disturbance or telescoping of the stream of tobacco leaves during its movement, and assist in the feeding thereof, a pressure plate 110 (Figs. 1, 7 and 8) is lowered by means which will be hereafter disclosed and bears on the tobacco while traveling therewith until the belt stops.

The up and down movement of pressure plate 110 is controlled from a plate cam 111 mounted on shaft 40 which engages a cam roller 112 carried by a cam lever 113 which is fastened on shaft 65. An arm 114 also fixed on shaft 65 is connected by a ball-and-socket joint to a slide-rod 116 which is fastened to a bracket 117 supporting the pressure plate 110. A pair of guide-rods 118 fixed in the bracket 117 are slidably mounted in bearings 119 provided on a carriage 120.

The back and forth movement of carriage 120 is obtained by means of a bevel gear 121 mounted on shaft 41 meshing with a bevel gear 122 attached to a shaft 123 carried by a bracket 124 fastened to the side frames 30 and 31. Shaft 123 also carries a spur gear 125 meshing with a spur gear 126 which in turn drives a rack 127 attached to the carriage 120. A bracket 128 attached to bracket 124 and a support 129 carried by a bracket 130 support a bottom rail 131. The upper edge 132 of rail 131 is tapered to fit the V-grooves formed in the periphery of the rollers 133 attached to the side of the carriage 120. An upper rail 134 is carried by the bracket 128 and a block 135 fastened to the wall 96 of the cross feed channel. A roller 136 located on the upper central portion of carriage 120 rides on the underside of rail 134, thus preventing the rollers 133 from jumping their rail 131. A pair of rollers 137 mounted on vertical studs on the carriage fit the space between the rail 134 and the end wall 96 whereby the endwise movement of the carriage is guided.

On a sleeve 138 (Fig. 10) loosely mounted on shaft 41 is fastened a spiral gear 139 which meshes with and drives a spiral gear 140 (Fig. 8) mounted on shaft 141. Shaft 141 is also equipped with a pulley 142 which drives the cross-feed belt 109. The gear 139 is intermittently driven by a pawl and ratchet arrangement which will be hereinafter described. The belt 109 and the pressure plate 110, which travel together at the same speed, advance the compressed stream of tobacco on to a vertically moving platform 145 where a desired length, equal to that of a cigar bunch, is cut off by a corrugated knife 143 (Figs. 12 and 13) having a configuration which at each cut forms the tuck-end of one length and the head-end of the next length thereby eliminating any waste of tobacco. The end of the platform nearest the knife and the end of the pressure plate 110 have a configuration corresponding to that of the knife 143; and the plate retains its position on the stream of tobacco during the cutting operation until the bunch length has been severed from the mass, whereupon the pressure plate is raised and returned to its initial position, ready for the next advance of the stream of tobacco.

To assure a clean cut, the knife 143 coacts with one edge of a ledger plate 144 which has a configuration conforming to the knife and bridges the gap between the feed belt 109 and platform 145 (Figs. 12 and 13), the platform having a corrugated edge interfitting the knife as indicated in Fig. 11 and the tobacco being held against the platform during the cutting operation by fingers 146 which are operated as hereinafter described. Ledger plate 144 is attached to a bracket 147 carried by a standard 148 which is mounted on a frame 130 of the machine. The corrugated knife 143 is attached to a lug 149 provided on a slide 150 slidable vertically in the standard 148. Slide 150 is equipped with a boss 151 carrying a tie bar 152 which supports the upper ends of vertical tie-rods 153. The lower ends of rods 153 are attached to a tie bracket 154 provided with a pivot 155 connected to one end of a cam lever 156, the lever 156 being fulcrumed on a pivot 157 supported in a bracket 158. Cam lever 156 carries a cam roller 159a engaging in a cam track, not shown, of a face cam 159 mounted on shaft 40. Lever 155 imparts vertical reciprocating motion to slide 150 and thus actuates the knife 143.

The reciprocating platform 145, which is in its up-position when the corrugated knife severs the tobacco, descends with the cut bunch length to a position at the level of the table 165 of the machine (Figs. 14 and 15). The platform 145 is operated by means of a cam 165a on shaft 40 engaging the cam roller 166 on a cam lever 167 which is connected by a link 168 to a collar 169 fastened on the vertical rod 170. The upper and lower ends of the rod 170 are guided in bores provided in the tie-bar 171 and an arm 172. The platform 145 is attached to a head 173 which is fastened on the upper end of the slide-rod 170. A tension spring 174 maintains the cam roller 166 in constant contact with the cam 165a.

The clamping fingers 146, which contact and hold the tobacco against the platform 145 while the bunch length is being cut, are operated by means of a plate cam 180 (Figs. 12 and 13) engaging a cam roller 181 carried by a cam lever 182 which is connected by a link 183 to an arm 184 clamped on a shaft 185 loosely mounted in bearings of a bracket 186. An arm 187, also clamped to stud 185 carries a pin 188 on which the fingers 146 are pivoted, the upper ends of said fingers being connected by a pin 189 to a link 190. At its opposite end the link 190 is mounted on a stud 191 protruding from a lug 192 of the bracket 186. A spring 193, which is coiled around the stud 185, has one end anchored in a collar 194 and its other end passes through an opening provided in bracket 186, and in this manner the spring acts to keep the roller 181 in contact with the cam 180.

When the platform 145 has descended and transported the cut bunch length to the level of table 165, a cam actuated pusher arm 200 (Figs. 11 and 16) engages the bunch length and pushes the same from the platform in a direction at right angles to its previous direction of travel, between upper and lower guides 201 and 202 (Figs. 19 and 21) set at the proper vertical distance apart corresponding to the thickness of bunch charge desired. The upper guides 201 are supported in horizontally spaced relationship by a bracket 203 mounted on vertical studs 204 carried by a knife bracket 205. The bracket 203, at its ends, is equipped with pairs of adjusting screws 206 and 207 which bear against the guide 202 and thus may be set to increase or decrease the space between the guides. The lower guide 202 is fastened to the top of the bracket 205, and a bracket 208 attached to an upright flange on bracket 203 carries guide strips 209 forming a continuation of the guide 201.

Figure 21A:
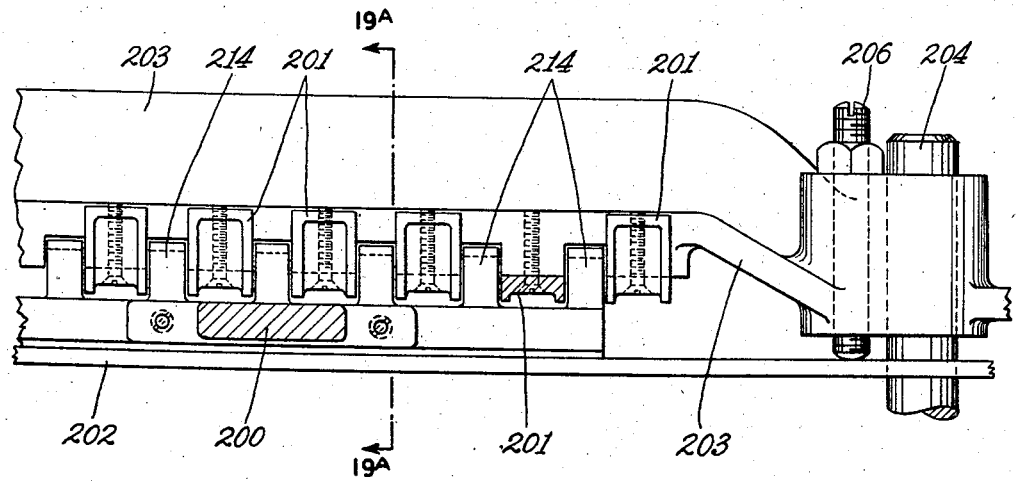
Fig. 21a is an enlarged end view similar to Fig. 21 showing the position of the prongs on pusher 214 between the lateral edges of the guides 201.

A cam 210 mounted on shaft 40 engages a cam roller 211 carried by a cam lever 212 which is fulcrumed on a cross-shaft 213 supported in side frames of the machine (Figs. 16, 23 and 24). On the upper end of lever 212 is pivotally mounted the forked hub of the arm 200 which, at its forward end, is equipped with a slotted finger 214 engaging the tobacco. In this manner the cam 210 imparts oscillatory motion to the pusher arm 200. A tension spring 215 stretched between a stud 216 in lever 212 and a stud, not show, fixed in a stationary member of the machine, tends to normally hold the cam roller 211 in contact with cam 210. When the finger 214 moves forward it pushes the bunch length of tobacco between the guides 201 and 202 and against a slotted measuring finger 220, thus uniformly compacting the tobacco to the required density, as will be presently described. The thickness or height of the forward end of the pusher is such that it will pass freely between the guides 201 and the guide 202, and the upwardly projecting teeth or prongs shown on the pusher 214 in Fig. 11 are aligned with the spaces between the lateral edges of the guides 201, so that these prongs will enter said spaces, as shown in Figs. 19a and 21a, while advancing the severed bunch length between guides 201 and guide 202. The pusher 214 moves forward between guides 201 and guide 202 to a sufficient extent to deliver the bunch length between the guide 280 and strips 209 against the measuring finger 220.

While the guides 201 are shown in Figures 19a and 21a as grooved on their underside, it is to be understood that this is simply a conventional showing of guides of this type and does not constitute a part of the invention herein. Also, these guides are secured by any conventional means to the bracket 203, as by screws or other suitable conventional fastening means, none of which constitute any part of the present invention. The measuring finger 220 (Figs. 16 and 24) is attached to an arm 221 pivotally mounted on a stud 222 supported in an arm 223. Arm 223 is clamped on a shaft 224 which also carries a fixed cam lever 225 supporting a cam roller 226 actuated by a face cam 227, mounted on cam shaft 40, and in this manner a vertical movement is imparted to the arm 221 and consequently to the measuring finger 220.

When the bunch length of tobacco is pushed against the finger 220 the arm 221 will be swung about its pivot 222 and, in so doing, operate a link 228 which is loosely mounted on a stud 229 in arm 221 and connected to an arm 230 clamped on the hub of an operating lever 231. Lever 231 is loosely mounted on a shaft 232 supported in a bracket 233 which also carries a fixed arm 234 equipped with a trip block 235 engaging the tails 236 of a plurality of independent pawls 237 pivotally mounted on a stud 238 in bracket 233. A counter-weighted arm 239 is clamped to shaft 232 and supports a rod 240 carrying a series of removable weights 241. When the tobacco pushed against the finger 220 is compacted to a density sufficient to overcome the leverage of the weights 241, the finger 220 will be pushed back until the lug 242 on the arm 239, which is turned through the linkage just described, stops against an adjusting screw 243. The screw 243 is carried by a bar fastened to the top of the side frame 30 and set in such relation with block 235 that the lug 242 of the counter-weighted arm 239 will be engaged at the same time that the tails 236 of pawls 237 drop into engagement with the notch 244 provided in block 235, and in this manner further displacement of the measuring finger will be prevented. During the forward movement of lever 212 while advancing the arm 200, a ratchet 245 and a cam piece 246 fixed on the lever are carried to a position beneath the pawls 237, wherein the ratchet teeth will be engaged by the pawls when the latter have been tripped during their engagement with the notch 244. The length of each of these pawls 237 is made one and one quarter tooth pitch longer than the other, so that the pawl tooth nearest in mesh will engage the ratchet, wherefore greater accuracy in measuring of the charge is attained. The bracket 233 is equipped with a pin 247 which passes through holes 248 provided in each of the pawls 237, these holes being sufficiently larger than the pin 247 to permit a radial displacement of the pawls slightly greater than the depth of the ratchet teeth. The engagement of any one of the pawls 237 with ratchet 245 stops the advancing movement of arm 200 and also disengages the cam roller 211 from its cam 210 by arresting the lever 212 against the pull of spring 215 thereby eliminating squeezing or compressing of the tobacco length. A compressed column of tobacco is thus held between the feed finger 214 and the measuring finger 220. The arm 239 is equipped with adjusting screws 249 and 250 which engage opposite sides of a vertical lug on level 231. These screws 249 and 250 permit changing of the relative position of lever 231 and all the members attached to it and shaft 232, whereby the displacement of the measuring finger 220 can be increased or decreased as desired, in accordance with the width of bunch charge desired.

From the compressed column confined between the feed finger 214 and measuring finger 220 a bunch charge is now severed by a knife 255. The charge-cutting knife 255 (Figs. 17, 18 and 22) is mounted in a frame 256 suspended from studs 257 carried by the projecting arms 258 of the upper tie-bracket 259. Bracket 259 and a lower tie-bracket 260 are clamped on the vertical slide-rods 261 which are guided in hubs 262 of bracket 205 and in bearings 264 adjustably attached to the frame of the machine. On a forked lug 265 of tie-bracket 260 is pivotally mounted one end of a rod 266 which is connected with a cam lever 267 fulcrumed on a cross shaft 268 of the machine. An upright arm 269 of lever 267 carries a cam roller 270 which engages a cam track 271 of cam 272 mounted on a main cam shaft, not shown, of the bunch machine. The knife 255 (Fig. 22) is formed of two separate sections which are fastened to frame 256 by screws passing through a clamp bar 273, and threaded into the frame, the bar being recessed to receive the stems 274 of two adjusting screws 275 which assure correct centering of the knife. On a bracket 276 is adjustably supported a block 277 carrying a ledger plate 278, bracket 276 being equipped with adjusting screws 279 which permit vertical adjustment of ledger plate 278 for aligning the same with guide 202 and guide 280. The member 280 is fastened to the top of the bracket 276 and forms a continuation of the guide 202. The guide 280, and the bracket 276 if necessary to avoid interference with the motion of the measuring finger 220, are provided with customary slots (not shown) as shown in the patent to V. G. Hanson, 1,791,558, February 10, 1931, which admit the prongs formed by the slots in the measuring finger 220 when the prongs are moved upwardly through the slots into position to oppose and compact the tobacco being advanced by finger 214. On each end of bracket 205 is pivoted an arm 281 which is equipped with a roller 282 engaging the knife frame 256. Rollers 282 are held in constant engagement with frame 256 by means of springs 283 which are seated in recesses provided in bracket 205 and arm 281, and in this manner the tongues 284 of the knife, which are guided in slots 285 of frame 256 are held against ledger plate 278. The charge-cutting knives used heretofore had an appreciable thickness and consequently removed thick slices of filler tobacco in severing the bunch charges, which slices were wasted. By using a very thin knife having a beveled cutting edge in accordance with my invention, no tobacco is wasted during the cutting operation. By pressing the tongues of the knife against the ledger plate, in accordance with the invention, the knife is continuously maintained in the proper relation to the ledger plate to sever the bunch charges most efficiently.

The cross-feed belt 109 is driven by means of its connections to a cam plate 290 (Fig. 9) which is provided with a cam track receiving a cam roller 291 carried by a cam lever 292 loosely mounted on a stud 293 set in a bracket 294. The lever 292 is provided with an elongated slot 295 which receives a stud 296 fixed in one end of a link 297, the other end of link 297 being pivotally connected to a rocker arm 298 loosely mounted on a cross shaft 299. The rocker arm 298 is equipped with a nose 300 which engages a shoulder on a spring tensioned pawl 301 suspended from a stud carried by a gear segment 302, loosely mounted on shaft 299. Segment 302 is provided with a lug 303 on which is pivoted a spring tensioned arm 304 which controls the pawl 301. The segment 302 meshes with and drives a gear segment 305 which is fastened on shaft 41, and an arm 306 integral with segment 305 supports two spring tensioned pawls 307 which engage and drive a ratchet 308 fixedly mounted on the sleeve 138, in a clockwise direction. The double pawl arrangement is used so that the pawl tooth nearest in mesh will engage and drive the ratchet, wherefore, greater accuracy in advancing the cross-feed belt is attained.

A lever 309 fixed on a shaft 310 is actuated by a screw 311 carried by lever 212 (Fig. 16), the engagement of screw 311 and member 309 turning shaft 310 together with a spring-tensioned arm 312 fixed on the shaft. Arm 312 carries a roller 313 which bears against the vertical arm 314 of member 304 and thereby swings the same about its pivot when the screw 311 meets the lever 309; whereby the arm 304, which has been holding the pawl 301 out of engagement with the block 300, retreats from the pawl, allowing the same to snap into engagement with the nose 300 of the rocker arm and thus connecting the same with the gearing 302—305. The turning of segment 305 also sets in motion the pinion 139 fastened on sleeve 138, the pinion meshing with the gear 140 on the drive shaft 141 of the feed belt 109 (Figs. 8 and 10), whereby the stream of tobacco is advanced one bunch length during each cycle of the machine. Upon the completion of the forward stroke of segment 302, which may be varied by changing the position of stud 296 in the slot 295 and thus provides means for varying the advance of belt 109, for different lengths of bunches, a cam piece 315 attached to cam 290 engages a roller 316 carried by an arm 317 which is loosely mounted on shaft 310. An arm 318 loose on the hub of arm 317 is adjustably fastened on the latter by a bolt 319. Bolt 319 is carried by a lug 320 of arm 318 and passes through a slot 321 provided in a tail piece 322 of arm 317. When the cam piece 315 engages the roller 316, the arm 318 is thus moved in a clockwise direction whereby the face 323 of said arm contacts a roller 324 attached to the pawl 301 and thereby releases the pawl from the rocker arm 300. The disconnecting of the rocker arm 300 and segment 302 permits a stud 298a carried by the lever 298 to engage the segment 302 and return the same to its original position, whereby the pressure plate 110 and its carriage are also returned to their starting position due to the anti-clockwise turning of segment 305 and shaft 41. During the backward turning of segment 305 the pawls 307 slip over the teeth of ratchet 308 whereby the ratchet and the members connected thereto remain stationary.

After the knife 255 has severed the bunch charge, the measuring finger 220 is lowered by means of its connections to the cam 227; and in the meantime the cam 210, which has been revolving idly, brings its high portion into engagement with cam roller 211. The lever 212 and arm 200 are thus caused to retreat, and in retreating the cam piece 246 engages a roller 330 carried by the pawls 237, thereby lifting the same and thus swinging their tails 236 off the shoulder 244 in member 235. When the member 235 is thus released the counter-weighted rod 240 descends, thereby returning all the members operated by shaft 232 to their original positions. A boss 331 on the periphery of cam 227 (Fig. 16) engages a cam roller 332 carried by a cam lever 333 which is also equipped with a roller 334. When lever 333 is lifted, the roller 334 which passes through a slot 335 in the table 165 engages a plate 200a on the arm 200 and thus lifts the same, thereby preventing the finger 214 from carrying back the tobacco dust which accumulates on the guide 202.

A number of spaced reaper arms 340 (Figs. 19 and 20) engage the compressed charge after it has been cut and convey it under the guide strips 209 and along the guide 280 to a charge transfer 400 of well known construction, which delivers the same to a rolling apron in which the charge is rolled within a binder to form a cigar bunch. The reapers 340 are carried by a crossbar 341 attached to projecting arms 342 of slide-brackets 343 and 344. The bracket 343 is connected by a link 345 to the upper end of an arm 346 which is clamped to a shaft 347 loosely mounted in the blocks 348 fixedly mounted on the slide-rods 261 of the charge-cutting unit. An arm 349 clamped to the other end of shaft 347 is connected by a link 350 to bracket 344. When the knife descends it will be seen that the reapers 340 will also descend upon the cut charge, the rear prongs on the reapers engaging behind the charge. The reapers then have reciprocating motion imparted thereto from a face cam 351 which is provided with a cam groove engaging a roller 352 carried by a cam lever 353, fulcrumed on shaft 213. Thus the cut charge is advanced along the guide 280 by the rear prongs of the reapers into position to be delivered to the charge transfer by the front prongs on the reapers during the next cycle of operations. The upper end of lever 353 is linked by a connecting rod 354 to the arm 346, the latter in turning also imparting motion to arm 349 and bracket 344, as just described. Brackets 343 and 344 are equipped with rollers 355 and 356 which engage and travel in a longitudinal track 347 in each of the guide-ways 358 and 359. Each of the guide-ways 358 and 359 is attached to the upper tie bracket 259 of the charge-cutting unit. Brackets 343 and 344 are also equipped with a roller 360 which engage the inner face of the guide-ways 358 and 359 respectively, these rollers being employed to prevent side play of the reapers 340. When the knife ascends, the reapers also ascend and are then returned endwise to their original position by means of cam 351.

Normally, a single bunch length will be compacted, and the bunch charge will be separated from the column of tobacco thus formed; but in order to take care of an oversupply of tobacco in the column, which is caused by the necessity of feeding slightly more tobacco than is needed for each charge, the filler feed is equipped with a feed control which arrests further feeding when sufficient tobacco for slightly more than two bunch charges is in the column. When sufficient tobacco is in the column, the arm 200 in moving inward advances the column against the measuring finger 220 and the latter is displaced sufficiently to permit the severing of a charge of the required size, at which time the advance of the arm is stopped by the engagement of pawls 237 with ratchet 245, as described above. Due to the oversupply of tobacco in the column the arm 200 and lever 212 are stopped before the latter can advance the feed actuating screw 311 against the lever 309, the undisturbed lever 309 therefore holding the pawl 301 of the gear segment 302 out of engagement with the nose 300. It will be seen that the rocker arm 298 will then turn idly about shaft 299, thus failing to drive the segments 302 and 305 and thereby arresting the advance of the feed-in conveyor 36—37 and the cross-feed belt 109.

What is claimed is:

1. In a cigar machine, the combination with means for forwarding a stream of cigar filler lengthwise, of mechanism for depositing layers of tobacco leaves in shingled relation on said means to form a continuous stream of filler tobacco thereon, mechanism for separating bunch lengths from said stream, mechanism for compacting the bunch lengths, a device for separating bunch charges from the compacted bunch lengths.

2. In a cigar machine, the combination with means for forwarding a stream of cigar filler lengthwise, of mechanism for depositing layers of tobacco leaves in shingled relation on said means to form a continuous stream of filler tobacco thereon, and mechanism for separating bunch lengths from said stream.

3. In a cigar machine, the combination with means for forwarding a stream of cigar filler, of mechanism for depositing layers of tobacco leaves on said means to form a continuous stream of predetermined thickness, mechanism for separating bunch lengths from said stream, mechanism for compacting the bunch lengths, and a device for separating bunch charges from the compacted bunch lengths.

4. In a cigar machine, the combination with means for forwarding a stream of cigar filler, of mechanism for depositing layers of tobacco leaves on said means to form a continuous stream of predetermined thickness, and mechanism for separating bunch lengths from said stream.

5. The combination with means for forwarding a stream of cigar filler lengthwise, of mechanism for depositing layers of uncut long filler in shingled relation on said means to form a continuous stream of filler tobacco thereon.

6. The combination with means for forwarding a stream of cigar filler lengthwise, of mechanism for delivering uncut long filler on said means to form a continuous stream wherein the filler extends lengthwise thereof.

7. In a cigar machine, the combination with means for forwarding a stream of cigar filler lengthwise, of mechanism for advancing tobacco leaves sidewise on to said means to form a continuous stream of filler tobacco of a thickness corresponding to the desired thickness of bunch lengths thereon, mechanism for separating bunch lengths from said stream and compacting the bunch lengths, and mechanism for separating bunch charges from the compacted bunch lengths.

8. The combination with means for forwarding a stream of cigar filler lengthwise, of mechanism for advancing tobacco leaves sidewise on to said means to form a continuous layer of filler tobacco of the desired thickness thereon, and mechanism for separating bunch lengths from said layer.

9. The combination with means for advancing tobacco leaves sidewise, of an endless traveling surface extending transversely of said means and adapted to forward tobacco leaves lengthwise, and a device for transferring tobacco leaves sidewise from said means to said surface to form a continuous stream of traveling tobacco leaves thereon in the direction of their length.

10. The combination with means for advancing tobacco leaves sidewise, of an endless traveling surface extending transversely of said means and adapted to forward tobacco leaves lengthwise, and a device for transferring tobacco leaves sidewise from said means to said surface to form a continuous stream of endwise traveling tobacco leaves thereon, said device including a sliding platform on to which the leaves are carried sidewise by said means, a member for pressing the leaves against said platform, mechanism for reciprocating said platform to advance the leaves into a position overlying said surface, and a stripper for transferring the leaves from said platform to said surface while the platform is returning to initial position.

11. In a cigar machine, the combination with an intermittently traveling endless surface adapted to advance a stream of filler tobacco, of a compactor plate adapted to engage the stream of tobacco on said surface, and mechanism for pressing said compactor plate against said stream and moving it bodily to follow the movement of said surface in order to assist in feeding said stream, said mechanism including a horizontally movable carriage on which said plate is mounted for vertical movement toward and away from the stream of tobacco on said surface.

12. In a cigar machine, the combination with a support for a mass of filler tobacco, of a yielding member adjacent said support, mechanism for pushing said mass of tobacco edgewise against said member until said member has been displaced a predetermined distance, and a device for separating a bunch charge from said mass after said member has been displaced through the predetermined distance, said mechanism including a pusher, linkage for moving said pusher in a rectilinear path, and means for locking said linkage after said member has been displaced through the predetermined distance.

13. In a cigar machine, the combination with a support for a mass of filler tobacco, of a yielding member adjacent said support, a pusher movable in a rectilinear path for pushing said mass of tobacco edgewise against said member until said member has been displaced a predetermined distance, mechanism for actuating said pusher and a device for separating a bunch charge from said mass after said member has been displaced through the predetermined distance, said mechanism being connected to and controlled by said member.

14. In a cigar machine, the combination with a support for a mass of filler tobacco, of a yielding member adjacent said support, a pusher movable in a rectilinear path for pushing said mass of tobacco edgewise against said member until said member has been displaced a predetermined distance, mechanism for actuating said pusher, means controlling the operation of said mechanism, and a device for separating a bunch charge from said mass after said member has been displaced through the predetermined distance, said means being adjustable to vary the distance through which said member is displaced.

15. In a cigar machine, the combination with a set of vertically spaced guides adapted to receive a mass of tobacco therebetween, a yielding member adjacent one end of said guides, a pusher for engaging the rear edge of and pushing a mass of tobacco between said guides and against said member, mechanism for actuating said pusher, means for incapacitating said mechanism when said member has been displaced through a predetermined distance, and a device for separating a bunch charge from said mass after said mechanism has been incapacitated.

16. In a cigar machine, the combination with a set of vertically spaced guides adapted to receive a mass of tobacco therebetween, a yielding member adjacent one end of said guides, a pusher for engaging the rear edge of and pushing a mass of tobacco between said guides and against said member, mechanism for actuating said pusher means for incapacitating said mechanism when said member has been displaced through a predetermined distance, and a device for separating a bunch charge from said mass after said mechanism has been incapacitated, said means operating to lock said mechanism.

17. In a cigar machine, the combination with a set of vertically spaced guides adapted to receive a mass of tobacco therebetween, a yielding member adjacent one end of said guides, a pusher for engaging the rear edge of and pushing a mass of tobacco between said guides and against said member, mechanism for actuating said pusher means for incapacitating said mechanism when said member has been displaced through a predetermined distance, a device for separating a bunch charge from said mass after said mechanism has been incapacitated, said means operating to lock said mechanism, and automatic means for unlocking said mechanism.

18. In a cigar machine, the combination with charge measuring cutting mechanism, of a charge transfer, and reaper fingers operating to simultaneously insert a cut charge into said transfer and advance the following charge away from said mechanism for delivery to said transfer during the next cycle of the machine, and means for actuating said reaper fingers.

19. In a cigar machine, the combination with means for compacting a mass of tobacco, of mechanism for delivering separate quantities of tobacco to said means, said means including a displaceable member against which said mass is compacted, a device controlled by said member for interrupting the further compacting of said mass when said member has been displaced a given distance, and instrumentalities for incapacitating said mechanism during the next cycle of operations of the machine when the compacted mass exceeds a predetermined length.

20. In a cigar machine, the combination with a movable platform, of means for intermittently advancing a stream of tobacco on to said platform, a device for separating bunch lengths from said stream after the same has been advanced on to said platform, mechanism for transferring the bunch lengths sidewise from said platform and compacting the same, a vertically reciprocating knife for severing a bunch charge from the compacted bunch length, and reaper fingers connected to said knife for vertical movement therewith.

21. In a cigar machine, the combination with a vertically movable knife, of means for intermittently advancing a stream of filler tobacco under said knife, whereby said knife will sever bunch lengths from said stream, mechanism for depositing tobacco leaves on said means to form a stream of tobacco thereon, and mechanism for advancing the severed bunch lengths.

22. In a cigar machine, the combination with a vertically movable knife, of means for intermittently advancing a stream of filler tobacco under said knife, whereby said knife will sever bunch lengths from said stream, mechanism for depositing tobacco leaves on said means to form a stream of tobacco thereon, and mechanism for advancing the severed bunch lengths, said bunch advancing mechanism controlling the operation of said means and depositing mechanism.

23. In a cigar machine, the combination with a vertically movable knife, of means for intermittently advancing a stream of filler tobacco under said knife, whereby said knife will sever bunch lengths from said stream, mechanism for depositing tobacco leaves on said means to form a stream of tobacco thereon, mechanism for advancing the severed bunch lengths, and a device for causing continuation of the operation of said means, said bunch advancing mechanism controlling the operation of said device, and said device being adjustable to regulate the extent of advancing movement of said means and thus govern the length of the severed bunch lengths.

24. In a cigar machine, the combination with a vertically movable knife, of means for intermittently advancing a stream of filler tobacco under said knife, whereby said knife will sever bunch lengths from said stream, mechanism for depositing tobacco leaves on said means to form a stream of tobacco thereon, mechanism for advancing and compacting the severed bunch lengths, and a device for causing continuation of the operation of said means, said bunch advancing and compacting mechanism controlling the operation of said device and depositing mechanism, and said device being adjustable to regulate the extent of advancing movement of said means and thus govern the length of the severed bunch lengths.

25. In a cigar machine, the combination with a vertically movable knife, of means for intermittently advancing a stream of filler tobacco under said knife, whereby the knife will sever sections from said stream, mechanism for depositing tobacco leaves on said means to form a stream of tobacco thereon, and mechanism for transporting the severed sections, said transporting mechanism controlling the operation of said means.

26. In a cigar machine, the combination with a primary wide tobacco feed and devices for feeding cigar bunch length tobacco portions along the same, of a secondary narrow feed arranged to receive and forward a narrow stream of tobacco transversely of said primary wide feed, mechanism for cutting bunch lengths from the forward end of said secondary feed and delivering the same onto said primary feed, and a tertiary feed movable transversely of said secondary feed to deliver tobacco leaves into said secondary feed with the leaves extending lengthwise of the direction of forwarding movement of said secondary feed.

27. In a cigar machine, the combination with a primary wide tobacco feed and devices for feeding cigar bunch length tobacco portions along the same, of a secondary narrow feed arranged to receive and forward a narrow stream of tobacco transversely of said primary wide feed, mechanism for cutting bunch lengths from the forward end of said secondary feed and delivering the same onto said primary feed, and a tertiary feed movable transversely of said secondary feed to deliver tobacco leaves into said secondary feed with the leaves extending lengthwise of the direction of forwarding movement of said feed, means for imparting movement to said secondary feed between deliveries of leaves by said tertiary conveyor, said movement being equal only to a fractional part of the length of the leaves.

28. In a long filler cigar machine, the combination with means for intermittently advancing a stream of long filler tobacco, of mechanism for separating and removing bunch lengths from said filler stream, a yielding member, a pusher having a rectilinear movement and acting to engage one lateral face of the bunch lengths and advance them sidewise against said yielding member to compact the bunch lengths to form a column of tobacco of predetermined density, a member for separating a bunch charge from said column, and a device controlled by said pusher for preventing operation of said filler feeding means for one cycle of operation whenever the volume of tobacco in the column exceeds that necessary for two bunch charges.

29. In a long filler bunch machine, the combination with a cross feed constructed and arranged to receive and forward an endwise moving stream of long filler tobacco leaves deposited in said feed with the leaves extending lengthwise of the feed, and cover means for said feed arranged to overlie the leaves at the position at which they are deposited to hold down the same as they are forwarded, and means for moving said cover means to and from said position.

30. In a long filler cigar bunch machine, the combination with a cross feed constructed and arranged to receive and forward an endwise moving stream of long filler tobacco leaves deposited in said feed with the leaves extending lengthwise of the feed, and cover means for said feed arranged to overlie the leaves at the position at which they are deposited to hold down the same as they are forwarded, and operating instrumentalities or intermittently opening said cover means to permit periodic depositing of tobacco leaves therein.

SIGURD CLAUSEN.